US011578252B2

(12) United States Patent
Larsen et al.

(10) Patent No.: US 11,578,252 B2
(45) Date of Patent: Feb. 14, 2023

(54) COMPOSITE DIVERTING PARTICULATES

(71) Applicant: Halliburton Energy Services, Inc., Houston, TX (US)

(72) Inventors: Travis Hope Larsen, Houston, TX (US); Aaron Michael Beuterbaugh, Spring, TX (US); Larry Steven Eoff, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 28 days.

(21) Appl. No.: 17/267,701

(22) PCT Filed: Nov. 30, 2018

(86) PCT No.: PCT/US2018/063246
§ 371 (c)(1),
(2) Date: Feb. 10, 2021

(87) PCT Pub. No.: WO2020/112130
PCT Pub. Date: Jun. 4, 2020

(65) Prior Publication Data
US 2021/0292634 A1    Sep. 23, 2021

(51) Int. Cl.
*C09K 8/516* (2006.01)
*C09K 8/502* (2006.01)
*C09K 8/64* (2006.01)
*C09K 8/92* (2006.01)

(52) U.S. Cl.
CPC .............. *C09K 8/516* (2013.01); *C09K 8/502* (2013.01); *C09K 8/64* (2013.01); *C09K 8/92* (2013.01)

(58) Field of Classification Search
None
See application file for complete search history.

(56) References Cited

U.S. PATENT DOCUMENTS

| 3,601,194 | A  | 8/1971  | Gallus |
| 7,398,826 | B2 | 7/2008  | Hoefer et al. |
| 7,565,929 | B2 | 7/2009  | Bustos et al. |
| 7,775,278 | B2 | 8/2010  | Willberg et al. |
| 8,030,249 | B2 | 10/2011 | Todd et al. |
| 10,696,893 | B2 | 6/2020  | Okamoto et al. |
| 2005/0194135 | A1 | 9/2005  | Nguyen et al. |
| 2006/0175059 | A1* | 8/2006  | Sinclair ................ E21B 43/261 166/313 |

(Continued)

OTHER PUBLICATIONS

ISRWO International Search Report and Written Opinion for PCT/US2018/063246 dated Aug. 28, 2019.

(Continued)

*Primary Examiner* — Anuradha Ahuja
(74) *Attorney, Agent, or Firm* — Thomas Rooney; C. Tumey Law Group PLLC

(57) ABSTRACT

Methods and compositions for introducing a treatment fluid into a wellbore penetrating a subterranean formation wherein the treatment fluid comprises: a base fluid; and composite diverting particulates, wherein the composite diverting particulates each comprise a degradable polymer and an oil-soluble material, wherein the composite diverting particulate at least partially plugs a zone in the subterranean formation; and diverting at least a portion of the treatment fluid and/or a subsequently introduced fluid away from the zone.

12 Claims, 4 Drawing Sheets

(56) References Cited

U.S. PATENT DOCUMENTS

| | | | |
|---|---|---|---|
| 2006/0185847 A1 | 8/2006 | Saini et al. | |
| 2008/0200352 A1* | 8/2008 | Willberg | C09K 8/516 166/280.1 |
| 2011/0005764 A1 | 1/2011 | Luo et al. | |
| 2012/0181034 A1* | 7/2012 | Bour | C09K 8/508 166/310 |
| 2013/0133887 A1* | 5/2013 | Todd | C09K 8/70 166/281 |
| 2015/0300140 A1 | 10/2015 | Eoff et al. | |
| 2016/0289525 A1 | 10/2016 | Recio, III et al. | |
| 2017/0166798 A1 | 6/2017 | Okamoto et al. | |
| 2018/0346787 A1 | 12/2018 | Belakshe et al. | |

OTHER PUBLICATIONS

Halliburton, AccessAcid Stimulation Service, H012243, Feb. 2017.
Baker Hughes, REAL Divert HT temporary diversion system, 2020.
Halliburton, AccessFrac Stimulation Service, H08720, Jun. 2013.
Trican, Trivert Diverting Agent, Accessed Jan. 2021.
FracTech—NuFlow, Available at https://www.nuflowtech.com/, Accessed Jan. 2021.

* cited by examiner

COMPOSITE DIVERTING PARTICULATES

BACKGROUND

After a wellbore is drilled and completed in a zone of a subterranean formation, it may often be necessary to introduce a treatment fluid into the zone. As used herein, "zone" simply refers to a portion of the formation and does not imply a particular geological strata or composition. For example, the producing zone may be stimulated by introducing a hydraulic fracturing fluid into the producing zone to create fractures in the formation, thereby increasing the production of hydrocarbons therefrom. In another example, a producing zone may require an acid treatment to enhance fractures already present in the formation. To ensure that the producing zone is uniformly treated with the treatment fluid, a treatment fluid including a diverting particulate may be used to facilitate the treatment fluid contacting the entire zone requiring treatment. A subterranean formation may have sections of varying permeability, reservoir pressures and/or varying degrees of formation damage, and thus may accept varying amounts of certain treatment fluids. For example, low reservoir pressure in certain areas of a subterranean formation or a rock matrix or a proppant pack of high permeability may permit that portion to accept larger amounts of certain treatment fluids. It may be difficult to obtain a uniform distribution of the treatment fluid throughout the entire treatment interval. For instance, the treatment fluid may preferentially enter portions of the interval with low fluid flow resistance at the expense of portions of the treatment interval with higher fluid flow resistance. In some instances, these intervals with variable flow resistance may be water-producing intervals.

In some methods of treating such subterranean formations, once the less fluid flow-resistant portions of a subterranean formation have been treated, that area may be sealed off using a variety of techniques to divert treatment fluids to more fluid flow-resistant portions of the interval. Such techniques may have involved, among other things, the injection of particulates, foams, emulsions, plugs, packers, or blocking polymers (e.g., crosslinked aqueous gels) into the interval so as to plug off high-permeability portions of the subterranean formation once they have been treated, thereby diverting subsequently injected fluids to more fluid flow-resistant portions of the subterranean formation.

In some techniques, a degradable polymer may be introduced into the wellbore and subsequently into the subterranean formation to bridge fractures and perforations to provide the diversion. Oftentimes, it is preferable to remove the degradable polymers after the treatment is completed to ensure maximum flow of formation fluids into the wellbore.

BRIEF DESCRIPTION OF THE DRAWINGS

These drawings illustrate certain aspects of some of the present disclosure, and should not be used to limit or define the disclosure.

DETAILED DESCRIPTION

Figure 1:
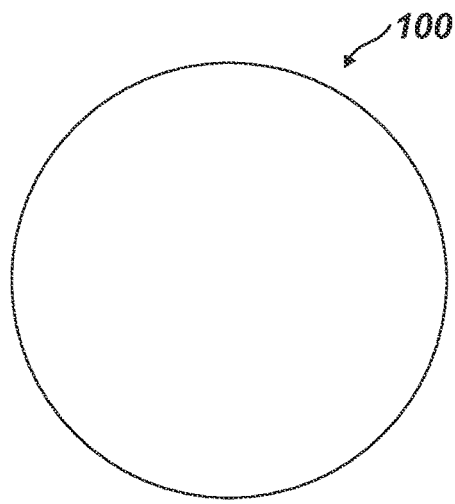
FIG. 1 is an illustration of an example composite diverting particulate in the form of a homogeneous compound.

The present disclosure is directed to subterranean treatments, and, at least in part, to using composite diverting particulates for controlling flow of fluids in wellbore applications, such as in diversion applications. Although certain degradable polymers have been previously used in diversion applications, there are several drawbacks such as high cost, low availability, and undesirable dissolution kinetics, among others. Herein, the use of composite diverting particulates including degradable polymers is disclosed. The composite diverting particulates may be used in fracturing, acidizing, and other wellbore operations to control the area of the formation where a treatment fluid is applied or acting on. An operator may choose to apply a composite diverting particulate to a particular formation zone to block off the treatment fluid from acting in that zone. A composite diverting particulate may be provided to plug perforations or bridge fractures in the formation thereby diverting the flow of a treatment fluid to another formation zone or flow path. Composite diverting particulates may be delivered downhole by any suitable method. A non-limiting example may include, by way of treatment fluid. Composite diverting particulates that include degradable polymers may have improved diversion, more rapid dissolution kinetics, especially at low temperatures, and reduced costs as compared to conventional diverting particulates. For example, the composite diverting particulates may be suitable for use at low temperatures, for example, in subterranean formations (or particular zones thereof) with temperature of about 350° F. (177° C.) or less, for example, ranging from 350° F. (177° C.) to 75° F. (25° C.). In an embodiment, the composite diverting particulates may be suitable for use at bottom hole temperatures of about 150° F. (65° C.) or less.

The treatment fluid may be any suitable treatment fluid for use in a variety of downhole applications. Suitable downhole applications may include, but are not limited to, drilling operations, lost circulation management operations, stimulation operations, sand control operations, perforating operations, completion operations, acidizing operations, scale inhibiting operations, water-blocking operations, clay stabilizer operations, fracturing operations, re-fracturing operations, frac-packing operations, gravel packing operations, wellbore strengthening operations, sag control operations, displacing solids laden drilling fluid, the like, and/or any combinations thereof. The treatment fluid may have a density of about 5.5 lb/gal (0.6 kg/L) or greater. For example, suitable treatment fluids may have a density at a point in range of from about 5.5 lb/gal (0.6 kg/L) to about 18.5 lb/gal (2.2 kg/L), or from about 7.5 lb/gal (0.9 kg/L) to about 18.5 lb/gal (2.2 kg/L), or from about 8.5 lb/gal (1 kg/L) to about 15 lb/gal (1.8 kg/L).

The treatment fluid may include a base fluid and a composite diverting particulate. Examples of suitable base fluids may be aqueous or non-aqueous. Suitable non-aqueous fluids may include one or more organic liquids, such as hydrocarbons (e.g., kerosene, xylene, toluene, or diesel), oils (e.g., mineral oils or synthetic oils), esters, and the like. Suitable aqueous base fluids may include, without limitation, water, freshwater, saltwater, brine, seawater, or any other suitable base fluids that preferably do not undesirably interact with the other components used in the treatment fluids. The base fluid may be present in the treatment fluids in an amount in the range of from about 1% to about 99.9% by volume of the treatment fluid. Optionally, the base fluid may be present in the treatment fluids in an amount, for example, in the range of from about 30% to about 80%, from about 30% to about 50%, or from about 50% to about 80% by volume of the treatment fluid.

The treatment fluid may further include a composite diverting particulate. The composite diverting particulate may include at least one degradable polymer and at least one oil-soluble material. In an embodiment, the composite diverting particulate may include more than one degradable polymer and/or more than one oil-soluble material. By inclusion of the oil-soluble material in the composite diverting particulate with the degradable polymer, the composite diverting particulate may provide enhanced cleanup during production, minimize risks of formation damage, and enable use of more rigid degradable polymers that may be less soluble but provide better bridging and diversion properties.

Composite diverting particulates are typically solid in form. Composite diverting particulates may be present in the treatment fluid in any amount for a particular application. Suitable amounts may include, but are not limited to, an amount of about 0.05% to about 75% by volume of the treatment fluid. In other examples, the composite diverting particulates may be present in the treatment fluid in an amount of about 0.05% to about 10% by volume of the treatment fluid, about 10% to about 20% by volume of the treatment fluid, about 20% to about 30% by volume of the treatment fluid, about 30% to about 40% by volume of the treatment fluid, or about 40% to about 50% by volume of the treatment fluid, or about 50% to about 60% by volume of the treatment fluid, or about 60% to about 75% by volume of the treatment fluid. These ranges encompass every number in between, for example. For example, the composite diverting particulates may be present in the treatment fluid in an amount ranging from about 0.5% to about 65% by volume of the treatment fluid. One of ordinary skill in the art with the benefit of this disclosure should be able to select an appropriate amount of the composite diverting particulates to use for a particular application. Composite diverting particulates may be in any suitable form.

Composite diverting particulates may be any suitable size capable of functioning as a diverting particulate. For example, suitable sizes may include a $D_v50$ particle size in the range from about 0.01 microns to about 400 microns, or from about 400 microns to about 10 millimeters, or from about 400 microns to about 2.5 millimeters, or from about 1 millimeter to about 10 millimeters. The $D_v50$ particle size may also be referred to as the median particle size by volume of a particulate material. The $D_v50$ particle size is defined as the maximum particle diameter below which 50% of the material volume exists. The $D_v50$ particle size values for a particular sample may be measured by commercially available particle size analyzers such as those manufactured by Malvern Instruments, Worcestershire, United Kingdom. Optionally, the composite diverting particulate may have a $D_v50$ particle size that ranges in size from about 1 millimeter to about 5 millimeters, or from about 3 millimeters to about 10 millimeters. Composite diverting particulates may be any suitable shape. Suitable shapes may include, but are not limited to, any physical shape as well as an irregular geometry, including the physical shape of platelets, shavings, fibers, flakes, ribbons, rods, strips, spheroids, beads, toroids, oviods, spheres, cylinders, tablets, wafers, or any other physical shape. In an embodiment, the composite diverting particulates may have an aspect ratio of about 1:1 to about 500:1, for example, ranging from about 5:1 to about 10:1, or about 1:1 to about 10:1, or about 5:1 to about 20:1, or about 1:1 to about 200:1, or about 1:1 to about 500:1, or about 200:1 to about 500:1. It should be noted that any suitable aspect ratio within the given range above may be used. With the present disclosure, one skilled in the art would be able to select an appropriate aspect ratio for a given application.

Composite diverting particulates may include an oil-soluble material. As used herein, the term "oil-soluble" refers to a material capable of dissolving when exposed to an oleaginous fluid (e.g., oil) under downhole conditions. Suitable oil-soluble materials include, but are not limited to, oil-soluble polymers, oil-soluble resins, oil-soluble elastomers, oil-soluble rubbers (e.g., latex), polybutadienes, polyisoprene, polyacrylics, polyamides, polyether urethanes, polyester urethanes, polyolefins, polyethylenes, polypropylenes, polystyrenes, carbonic acids, asphaltenes, gilsonite, amines, waxes, animal waxes, plant waxes, mineral waxes, petroleum waxes, the like, copolymers thereof, derivatives thereof, and/or any combination thereof. A number of factors may be considered when selecting an oil-soluble material to use, including, but not limited to, melting point and bottomhole static temperatures. In some embodiments, the oil-soluble material may be selected to have a melting point that is close (e.g., within about 5° C.) of the bottomhole static temperature so that it should melt and more flow more easily during flowback.

The oil-soluble material present in the composite diverting particulate may be defined by its solubility. As used herein, "solubility" may refer to the physical property of a material's ability to dissolve in a solvent. The solvent used herein may be an oil-based fluid (e.g. produced fluid). It should be noted that the term "oil," as used herein, is not limited to a viscous liquid derived from petroleum. The term "oil," as used herein, may also refer to organic oils, synthetic oils, oils derived from petroleum products, mineral oils, the like, and/or any combination thereof. One of ordinary skill in the art, along with the present disclosure would be able to select the appropriate type of oil for a given application. The solubility of an oil-soluble material may be quantified by its rate of dissolution. The oil-soluble material may have any suitable rate of dissolution. As used herein, a material may be considered oil-soluble based on the mass parts solvent required to dissolve 1 mass part of the solute, wherein a material is considered oil soluble if less than 1000 mass parts of oil are required to dissolve 1 mass part of solvent.

Oil-soluble material may be present in the composite diverting particulate in any suitable amount including, but not limited to, an amount in the range of from about 1% to about 90% by weight of the composite diverting particulate or from about 25% to about 75% by weight of the composite diverting particulate. For example, oil-soluble material may be present in the range from about 1% to about 90%, about 10% to about 50%, or about 50% to about 95% by weight of composite diverting particulate. For example, suitable amounts of oil-soluble material present in the composite diverting particulate may include, but are not limited to, about 1%, about 10%, about 20%, about 30%, about 40%, about 50%, about 60%, about 70%, about 80%, or about 90% by weight of the composite diverting particulate. It should be noted that these ranges encompass every number in between. In an embodiment, more than one type oil-soluble material may be present in the composite diverting particulate. Each oil-soluble material in the composite diverting particulate may be present in any suitable amount. One of ordinary skill in the art, with the benefit of the present disclosure, should be able choose the appropriate number of degradable polymers for a given application.

The composite diverting particulates may further include a degradable polymer. The degradable polymer may be at least partially degradable. The terms "polymer" or "polymers" as used herein do not imply any particular degree of polymerization; for instance, oligomers are encompassed within this definition. A polymer is considered to be "degradable" herein if it is capable of undergoing an irreversible degradation when used in subterranean applications, e.g., in a wellbore. The term "irreversible" as used herein means that the degradable polymer should degrade in situ (e.g., within a wellbore) but should not recrystallize, precipitate, or reconsolidate in situ after degradation (e.g., in a wellbore).

In an embodiment, a degradable polymer present in the composite diverting particulate may be defined by its degree of hydrolysis. As used herein, the term "degree of hydrolysis" may be defined as the percentage of polymeric chain that contains poly-alcohol functional groups as derived from base hydrolysis of polyvinyl acetates. The degree of hydrolysis may be determined using any conventional method known in the art, including but not limited to, chemical analysis, nuclear magnetic resonance analysis, the like, and/or any combination thereof. Optionally, a degradable polymer present in the composite diverting particulate may be defined by its molecular weight. As used herein, the term "molecular weight" refers to weight average molecular weight. The degree of hydrolysis and molecular weight may directly correlate to the strength of the bridge/seal the degradable polymer may form within the formation. The degree of hydrolysis may also directly correlate with the strength of the bridge formed with the degradable polymer and the maximum amount of pressure the bridge may withstand. The degree of hydrolysis and molecular weight may be inversely correlated to the solubility of the degradable polymer.

Degradable polymers may include, but are not be limited to, dissolvable polymers, polymers that deform or melt upon heating such as thermoplastic materials, hydrolytically degradable polymers, materials degradable by exposure to radiation, materials reactive to acidic fluids, or any combination thereof. In some embodiments, degradable polymers may be degraded by temperature, moisture, oxygen, microorganisms, enzymes, pH, free radicals, and the like. In some embodiments, degradation may be initiated in a subsequent treatment fluid introduced into the subterranean formation at some time when diverting is no longer necessary. In some embodiments, degradation may be initiated by a delayed-release acid, such as an acid-releasing degradable polymer or an encapsulated acid, and this may be included in the treatment fluid including the degradable polymer so as to reduce the pH of the treatment fluid at a desired time, for example, after introduction of the treatment fluid into the subterranean formation.

Any suitable degradable polymer may be used. Suitable degradable polymers may include polysaccharides such as cellulose; chitin; chitosan; aliphatic polyesters; and proteins. Such suitable polymers may be prepared by polycondensation reactions, ring-opening polymerizations, free radical polymerizations, anionic polymerizations, carbocationic polymerizations, coordinative ring-opening polymerizations, as well as by any other suitable process. Examples of specific degradable polymers that may be used in conjunction with the example methods include, but are not limited to, aliphatic poly(esters); poly(lactides); poly(glycolides); poly(ε-caprolactones); poly(hydroxyester ethers); poly(hydroxybutyrates); poly(anhydrides); polycarbonates; polyols; poly(orthoesters); poly(aminoacids); poly(ethyleneoxides); poly(phosphazenes); poly(etheresters), hydroxy propyl methylcellulose, pectin, polyethylene oxide, polyvinyl alcohol, plasticized polyvinyl alcohol, alginate, polycaprolactone, gelatinised starch-based materials, polyester amides, polyamides, copolymers, terpolymers, and the like; and/or blends of any of these degradable polymers, and derivatives of these degradable polymers. As referred to herein, the term "derivative" is defined herein to include any compound that is made from one of the listed compounds, for example, by replacing one molecule in the base compound with another molecule or group of molecules. Other degradable polymers that are subject to hydrolytic degradation also may be suitable. One's choice may depend on the particular application and the conditions involved. Other guidelines to consider include the degradation products that result, the time required for the requisite degree of degradation, and the desired result of the degradation (e.g., voids). The degradable polymer may be of any suitable size. Suitable sizes may range from about 10 microns to about 2,000 microns. It should be noted that any size and/or size range within the specified range may be used.

In an embodiment, the degradable polymer may include polyvinyl alcohol (PVA) or another suitable polyol. PVA may be a solid material that may be manufactured in many forms, such as, for example, fibers, sheets, granules, beads, powder, and the like. PVA may be a synthetic polymer that may be water soluble and generally unaffected by petroleum hydrocarbons. The polymer includes a carbon chain backbone with hydroxyl and acetate groups. PVA may be produced by the hydrolysis of polyvinyl acetate in methanol catalyzed by a hydroxide base. PVA may exist in three different aggregation states, which may be controlled by solution conditions. In a solid state, PVA may be semi-crystalline. The degree of crystallinity varies from one mode of manufacture to another and with the degree of hydrolysis and grade of the PVA. In aqueous solution, PVA may lose crystallinity and swell to form an amorphous structure, which may be flexible and malleable, but not yet solubilized. Depending on solution conditions, PVA may solubilize completely and exist as polymer strands in solution.

Dissolution of PVA may be dependent on a number of factors, including, but not limited to, the degree of hydrolysis, molecular weight, crystallinity, particle size, exposure temperature, and the like of the PVA. The degree of hydrolysis may be defined as the mole percent of hydroxyl groups on the polymer chain in relation to the non-hydrolyzed acetate groups. For example, PVA with a degree of hydrolysis of 88 would have 88 mole percent hydroxyl groups and 12 mole percent acetate groups along the polymer backbone. The hydroxyl and/or acetate groups may be distributed randomly or in blocks. Other factors affecting PVA solubility may include polymer concentration and salt concentration; the amount of unsolubilized PVA, e.g., amorphous PVA, may increase with increased concentrations of salt or polymer. The crystallinity of the PVA may also be used to control the rate at which the PVA will dissolve at various temperatures.

In an embodiment, the degradable polymer may include a plasticized polyvinyl alcohol. The plasticized polyvinyl alcohol may be a degradable polyvinyl alcohol that further includes a plasticizer. The plasticizer may plasticize the polyvinyl alcohol. The plasticized PVA may stabilize the PVA in the oil-soluble diverter material. In certain embodiments, the plasticizer may reduce the melting point of PVA below its degradation point, allowing for the PVA to be liquefied and processed through an extruder to form larger particles of PVA than is possible without the plasticizer. In some embodiments, the plasticizer may be a surfactant. Plasticizers suitable for certain embodiments of the present disclosure may include, but are not limited to glycol, polyethylene glycol, polypropylene glycol, fatty acid esters, lactide monomers, glycolide monomers, citric acid esters, epoxidized oil, adipate ester, or azaleate. For example, suitable amounts of plasticizers present in the oil-soluble plasticized diverter material may include, but are not limited to, about 0.001% to about 10%, about 0.001% to about 5%, about 5% to about 10% by weight of oil-soluble plasticized diverter material. It should be noted that these ranges encompass every number in between.

The degradable polymer may be present in the composite diverting particulate in any suitable amount, including, but not limited to, an amount in the range of from about 10% to about 99% by weight of the composite diverting particulate or from about 25% to about 75% by weight of the oil-soluble diverting particulate. For example, the degradable polymer may be present in the range from about 10% to about 50%, or about 40% to about 99%, or about 60% to about 90% by weight of the composite diverting particulate. For example, suitable amounts of the degradable polymer present in the composite diverting particulate may include, but are not limited to, about 10%, about 20%, about 30%, about 40%, about 50%, about 60%, about 70%, about 80%, about 90%, or about 99% by weight of the composite diverting particulate. It should be noted that these ranges encompass every number in between. The degradable polymer in the composite diverting particulate may be present in any suitable amount. One of ordinary skill in the art, with the benefit of the present disclosure, should be able choose the appropriate amount of the degradable polymer to include for a given application.

Any suitable technique may be used for preparation of the composite diverting particulates. Suitable techniques may include, but are not limited to, spray coating, fluidized bed, tumbling, compression coating, dip coating, vacuum film coating, co-extrusion, the like, and/or any combination thereof. In an embodiment, the degradable polymer and the oil-soluble material may occupy distinct regions of the composite diverting particulates. In an embodiment, the composite diverting particulate may include a homogenous compound that includes the degradable polymer and the oil-soluble material. The homogenous compound may be prepared by uniformly mixing the degradable polymer and the oil-soluble material. In an embodiment, the composite diverting particulate may include a continuous phase and an internal phase. The continuous phase may include a degradable polymer and the internal phase may include an oil-soluble material. The internal phase of the oil-soluble material may be dispersed in the continuous phase of the degradable polymer.

Figure 2:
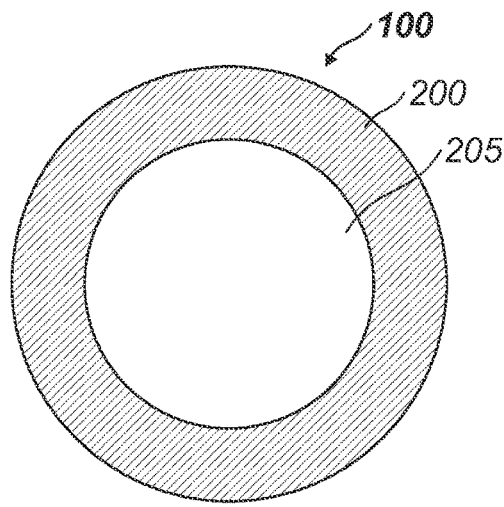
FIG. 2 is an illustration of another example composite diverting particulate.
Figure 3:
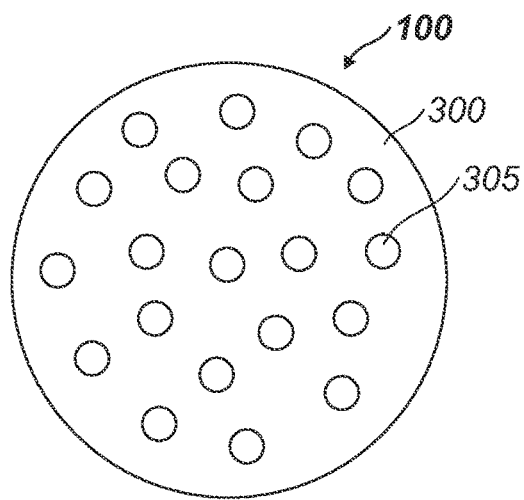
FIG. 3 is an illustration of yet another example composite diverting particulate.

FIGS. 1, 2, and 3 illustrate examples of a composite diverting particulate 100. FIG. 1 illustrates the composite diverting particulate 100 in the form of a homogenous compound. As previously described, the composite diverting particulate 100 in the form of a homogenous compound may include a degradable polymer and an oil-soluble material. FIG. 2 illustrates another example of a composite diverting particulate 100. The composite diverting particulate 100 shown on FIG. 2 includes a first region 200 and a second region 205. The first region 200 may include a degradable polymer and the second region 205 may include an oil-soluble material. Optionally, more than one degradable polymer (or grade thereof) may be present. Optionally, more than one oil-soluble material may be present. As illustrated on FIG. 2, the first region 200 may be coated on the second region 205 such that the oil-soluble material may be disposed within the first region 200 of the degradable polymer. FIG. 3 illustrates another example of a composite diverting particulate 100. The composite diverting particulate 100 shown on FIG. 3 may include a continuous phase 300 and an internal phase 305. The continuous phase 300 may include the degradable polymer. Internal phase 305 may include the oil-soluble material. It should be noted, that any number of distinct regions may be present and the present disclosure should not be limited to the two distinct regions disclosed above. With the present disclosure, one of ordinary skill in the art would be able to determine the appropriate number of distinct regions for a given application.

As previously discussed, it may be preferable that a composite diverting particulate introduced into the wellbore be at least partially dissolvable, degradable, or removable to ensure production of formation fluids may be minimally affected by the composite diverting particulate. When the composite diverting particulate is soluble in water, the composite diverting particulate may be readily removed from the formation by waiting until the composite diverting particulate is dissolved. Where the composite diverting particulate is slightly soluble or may become soluble under certain conditions, a chemical agent that increases the solubility of the composite diverting particulate may be included. Any chemical agent capable of increasing the dissolution rate of the composite diverting particulate may be included. In a non-limiting example, the chemical agent may be, an inert dissolvable material, a dissolution accelerator, the like, or any combination thereof. In examples where the composite diverting particulate is insoluble in water, the composite diverting particulate may still allow production of formation fluids and provide additional beneficial properties to the near wellbore region such as propping of fractures.

The composite diverting particulate may further include an inert filler material. Inert filler materials may be included as a filler material for decreasing overall cost of the composite diverting particulate, or increase the bridging performance, of the diverting particulate, while also potentially increasing the overall dissolution rate of the composite diverting particulate. Suitable inert filler material may include, but are not limited to, salts or other inorganic compounds (e.g., calcium carbonate, sand, etc.). Inert materials may be present in any suitable amount. For example, suitable amounts may include, but are not limited to, 1% to about 50% by weight of the composite diverting particulate, or about 1% to about 25% by weight of the composite diverting particulate, or about 25% to about 50% by weight of the composite diverting particulate.

Composite diverting particulate may further include a dissolution accelerator. Any suitable dissolution accelerator capable of increasing the overall dissolution rate of the composite diverting particulate downhole may be used. Suitable dissolution accelerators may include, but are not limited to, inorganic acids, solid organic acids, simple saccharides, metal salts, the like, and/or any combination thereof. Suitable solid inorganic acids may include sulfamic acid. Suitable solid organic acids may include citric acid, ethylenediaminetetra-acetic acid (EDTA), N-Phosphonomethyl iminodiacetic acid (PMIDA), anhydrides, ortho esters, phosphonate esters, the like, and/or any combination thereof. Suitable simple saccharides, such as monosaccharides and disaccharides, may include glucose, fructose, galactose, manose, sucrose, and lactose. Combinations of suitable dissolution accelerators may also be used. For example, dissolution accelerators may be present in any suitable amount including, but not limited to, 1% to about 50% by weight of the composite diverting particulate, or about 1% to about 10% by weight of the composite diverting particulate, or about 10% to about 20% by weight of the composite diverting particulate, or about 20% to about 30% by weight of the composite diverting particulate, or about 30% to about 40% by weight of the composite diverting particulate, or about 40% to about 50% by weight of the composite diverting particulate.

Without limitation, placing the composite diverting particulate into the subterranean formation may include placement into a wellbore or into the region of the subterranean formation surrounding the wellbore. In the subterranean formation, the composite diverting particulate may form a barrier to fluid flow. Without limitation, this barrier to fluid flow may be used for controlling fluid, for example, in diversion to divert treatment fluids to another area, or in fluid loss control to reduce leak off into the subterranean formation. Advantageously, the composite diverting particulate may be degradable so that they may be easily removed from the subterranean formation to facilitate production, for example, without the need for additional removal applications.

In addition to the composite diverting particulate, the treatment fluid may include any number of additional additives, including, but not limited to, surfactants, acids, fluid loss control additives, gas, foamers, corrosion inhibitors, scale inhibitors, catalysts, clay control agents, biocides, friction reducing polymers, antifoam agents, bridging agents, dispersants, flocculants, $H_2S$ scavengers, $CO_2$ scavengers, oxygen scavengers, lubricants, gelling agents, breakers, weighting agents, particulate materials (e.g., proppant particulates) and any combination thereof. With the benefit of this disclosure, one of ordinary skill in the art should be able to recognize and select suitable additives for use in the treatment fluid.

In an embodiment, proppant particulates may be included in the treatment fluid. For example, where the treatment fluid is a fracturing fluid, the treatment fluid may transport proppant particulates into the subterranean formation. Examples of suitable proppant particulates may include, without limitation, sand, bauxite, ceramic materials, glass materials, polymer materials, polytetrafluoroethylene materials, nut shell pieces, cured resinous particulates including nut shell pieces, seed shell pieces, cured resinous particulates including seed shell pieces, fruit pit pieces, cured resinous particulates including fruit pit pieces, wood, composite particulates, and combinations thereof. Suitable composite particulates may include a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, microproppant, solid glass, and combinations thereof. Without limitation, the proppant particulates may include graded sand. Other suitable proppant particulates that may be suitable for use in subterranean applications may also be useful. By way of example, the proppant particulates may have a particle size in a range from about 3.5 mesh (5.6 mm) to about 400 mesh (0.037 mm), U.S. Sieve Series. The proppant particulates may be carried by the treatment fluid. For example, the proppant particulates may be present in the treatment fluid in a concentration of about 0.1 pounds per gallon (ppg) (12 kg/m$^3$) to about 10 ppg (1,198 kg/m$^3$), about 0.2 ppg (24 kg/m$^3$) to about 6 ppg (719 kg/m$^3$). These ranges encompass every number in between, for example. For example, the concentration may range between about 0.5 ppg (60 kg/m$^3$) to about 4 ppg (479 kg/m$^3$). One of ordinary skill in the art with the benefit of this disclosure should be able to select an appropriate amount of the proppant particulates to use for a particular application.

In an embodiment, the treatment fluid may be an acidic treatment fluid. The treatment fluid may be an aqueous acid treatment fluid, for example, when used in acidizing treatments. By way of example, the treatment fluid may include one or more acids, including, but not limited to, mineral acids, such as hydrochloric acid and hydrofluoric acid, organic acids, such as acetic acid, formic acid, and other organic acids, urea complexes, such as urea hydrochloride, chelating acids, such as ethylenediamine tetracetic acid, or mixtures thereof. In acidizing treatments, mixtures of hydrochloric acid and hydrofluoric may be used, in some instances.

In an embodiment, the treatment fluid may include a friction reducing polymer. The friction reducing polymer may be included in the treatment fluid to form a slickwater fluid, for example. The friction reducing polymer may be a synthetic polymer. Additionally, for example, the friction reducing polymer may be an anionic polymer or a cationic polymer. By way of example, suitable synthetic polymers may include any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof. Without limitation, the friction reducing polymer may be included in the treatment fluid to provide a desired amount of friction reduction. For example, the friction reducing polymer may be included in the treatment fluid, for example, in an amount equal to or less than 0.2% by weight of an aqueous-based fluid present in the treatment fluid. Without limitation, the friction reducing polymer may be included in the treatment fluid in an amount sufficient to reduce friction without gel formation upon mixing. By way of example, the treatment fluid including the friction reducing polymer may not exhibit an apparent yield point.

In an embodiment, the treatment fluid may include a gelling agent. The gelling agent may be included in the treatment fluid to form an aqueous gel, foamed gel, or oil gel, for example. Suitable gelling agents may include any polymeric material capable of increasing the viscosity of a base fluid, such as an aqueous fluid. Without limitation, the gelling agent may include polymers that have at least two molecules that may be capable of forming a crosslink in a crosslinking reaction in the presence of a crosslinking agent, and/or polymers that have at least two molecules that are crosslinked (i.e., a crosslinked gelling agent). Other suitable gelled fluids may include linear gels that are not crosslinked. The gelling agents may be naturally-occurring, synthetic, or a combination thereof. Suitable gelling agents may include polysaccharides, and derivatives thereof that contain one or more of these monosaccharide units: galactose, mannose, glucoside, glucose, xylose, arabinose, fructose, glucuronic acid, or pyranosyl sulfate. Examples of suitable polysaccharides include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), and combinations thereof. The gelling agents include an organic carboxylated polymer, such as CMHPG. Additionally, polymers and copolymers that include one or more functional groups (e.g., hydroxyl, cis-hydroxyl, carboxylic acids, derivatives of carboxylic acids, sulfate, sulfonate, phosphate, phosphonate, amino, or amide groups) may be used. Where used, the gelling agent may be present in the treatment fluids in an amount sufficient to provide the desired viscosity. For example, the gelling agents may be present in an amount in the range of from about 0.1% to about 10% by weight of the treatment fluid and, alternatively, from about 0.5% to about 4% by weight of the treatment fluid.

In an embodiment, a crosslinking agent may be included in the treatment fluids where it is desirable to crosslink the gelling agent. The crosslinking agent may include a metal ion that is capable of crosslinking at least two molecules of the gelling agent. Examples of suitable crosslinking agents include, but are not limited to, borate ions, zirconium IV ions, titanium IV ions, aluminum ions, antimony ions, chromium ions, iron ions, copper ions, magnesium ions, and zinc ions. These ions may be provided by providing any compound that is capable of producing one or more of these ions; examples of such compounds include, but are not limited to, boric acid, disodium octaborate tetrahydrate, sodium diborate, pentaborates, ulexite, colemanite, zirconium lactate, zirconium triethanol amine, zirconium lactate triethanolamine, zirconium carbonate, zirconium acetylacetonate, zirconium maleate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, aluminum citrate, antimony compounds, chromium compounds, iron compounds, copper compounds, zinc compounds, and combinations thereof. Without limitation, the crosslinking agent may be formulated to remain inactive until it is "activated" by, among other things, certain conditions in the fluid (e.g., pH, temperature, etc.) and/or contact with some other substance. Without limitation, the crosslinking agent may be delayed by encapsulation with a coating (e.g., a porous coating through which the crosslinking gent may diffuse slowly, or a degradable coating that degrades downhole) that delays the release of the crosslinking agent until a desired time or place. The choice of a particular crosslinking agent will be governed by several considerations that will be recognized by one skilled in the art, including but not limited to the following: the type of gelling agent included, the molecular weight of the gelling agent(s), the pH of the treatment fluid, temperature, and/or the desired time for the crosslinking agent to crosslink the gelling agent molecules.

Where used, suitable crosslinking agents may be present in the treatment fluids in an amount sufficient to provide, inter alia, the desired degree of crosslinking between molecules of the gelling agent. Without limitation, the crosslinking agent may be present in the treatment fluids in an amount in the range of from about 0.0005% to about 0.2% by weight of the treatment fluid or alternatively from about 0.001% to about 0.05% by weight of the treatment fluid. One of ordinary skill in the art, with the benefit of this disclosure, should recognize the appropriate amount of crosslinking agent to include in a treatment fluid based on, among other things, the temperature conditions of a particular application, the type of gelling agents used, the molecular weight of the gelling agents, the desired degree of viscosification, and/or the pH of the treatment fluid.

In an embodiment, the treatment fluid may further include a gel breaker, which may be useful for reducing the viscosity of the viscosified fracturing fluid at a specified time. A gel breaker may include any compound capable of lowering the viscosity of a viscosified fluid. The term "break" (and its derivatives) as used herein refers to a reduction in the viscosity of the viscosified treatment fluid, e.g., by the breaking or reversing of the crosslinks between polymer molecules or some reduction of the size of the gelling agent polymers. No particular mechanism is implied by the term. Suitable gel breaking agents for specific applications and gelled fluids may include oxidizers, peroxides, enzymes, acids, and the like. Some viscosified fluids also may break with sufficient exposure of time and temperature.

Example methods of using the composite diverting particulate will now be described in more detail. As previously described, the composite diverting particulate may be placed in the subterranean formation such that a barrier to fluid flow may be formed. Without limitations, the composite diverting particulate may form packs, bridges, filter cakes, or other suitable barriers to thereby obstruct fluid flow. Without limitation, this barrier to fluid flow may be used, for example, in diversion to divert treatment fluids to another area and in fluid loss control to reduce leak off into the subterranean formation. The fluid flow preventing barrier may be formed in the subterranean formation to block certain flow paths in the subterranean formation, reducing the flow of fluids through the subterranean formation. Examples of the types of flow paths that may be blocked by the fluid flow preventing barrier include, but are not limited to, perforations, such as those formed by a perforation gun, fissures, cracks, fractures, micro fractures, streaks, flow channels, voids, vugs high permeable streaks, annular voids, or combinations thereof, as well as any other zone in the formation through which fluids may undesirably flow.

The composite diverting particulate may be used in a variety of subterranean operations, where formation of a fluid flow diverting (or flow preventing) barrier may be desired, such as fluid diversion, and fluid loss control. Fluid diversion may be desired in a number of subterranean treatments, including fracturing and acidizing. Fluid loss control may be desired in a number of subterranean treatments, including, without limitation, drilling operations, fracturing operations, acidizing operations, work-over operations, and gravel packing operations. The composite diverting particulate may be used prior to, during, or subsequent to a variety of subterranean operations. Methods of using the composite diverting particulate may first include preparing a treatment fluid including the composite diverting particulate. The treatment fluids may be prepared in any suitable manner, for example, by combining the composite diverting particulate, base fluid, and any of the additional components described herein in any suitable order.

Methods may include introduction of the composite diverting particulate into a subterranean formation. Introduction into the subterranean formation is intended to include introduction into a wellbore penetrating a subterranean formation, introduction into the zone(s) surrounding the wellbore, or both. A treatment fluid containing the composite diverting particulate may dissipate into the subterranean formation through openings, which may be naturally occurring (e.g., pores, cracks, fractures, micro fractures fissures, etc.) or man-made. As the treatment fluid dissipates into the subterranean formation, the composite diverting particulate may be screened out by the formation, whereby the composite diverting particulate may be packed into the openings. In the subterranean formation, the composite diverting particulate may form a flow preventing barrier that blocks certain flow paths therein, reducing the flow of fluids through the subterranean formation. Examples of the types of flow paths that may be blocked by the composite diverting particulate include, but are not limited to, perforations, such as those formed by a perforation gun, fissures, cracks, fractures, micro fractures, streaks, flow channels, voids, high permeable streaks, annular voids, or combinations thereof, as well as any other zone in the formation through which fluids may undesirably flow. Methods may further include selecting one or more zones of the subterranean formation for control of fluid flow in which the composite diverting particulate may be introduced. In an embodiment, additional treatment fluids may be introduced into the wellbore, wherein the treatment fluids may contain additional composite diverting particulates or other diverting particulates. The composite diverting particulates (or other diverting particulates) in each treatment fluid may be different sizes. In an embodiment, the first treatment fluid may include large composite diverting particulates and each subsequent diverting particulate (or composite diverting particulate) may decrease in size. In addition, additional solid diverting particulates (or composite diverting particulates) may be included in each treatment fluid so that plugs may be formed with particles of different sizes.

The composite diverting particulate may be used as fluid loss control agents, among others. Providing effective fluid loss control for subterranean treatment fluids may be highly desirable. "Fluid loss," as that term is used herein, refers to the undesirable migration or loss of fluids (such as the fluid portion of a drilling mud or cement slurry) into a subterranean formation and/or a proppant pack. Treatment fluids may be used in any number of subterranean operations, including drilling operations, cementing, fracturing operations, acidizing operations, gravel-packing operations, wellbore clean-out operations, pickling, and the like. Fluid loss may be problematic in any number of these operations. In fracturing treatments, for example, fluid loss into the formation may result in a reduction in fluid efficiency, such that the fracturing fluid cannot propagate the fracture as desired. Fluid loss control materials are additives that lower the volume of a filtrate that passes through a filter medium. That is, they block the pore throats, vugs, fractures, and spaces that otherwise allow a treatment fluid to leak out of a desired zone and into an undesired zone. Particulate materials may be used as fluid loss control materials in subterranean treatment fluids to fill/bridge the pore spaces in a formation matrix and/or proppant pack and/or to contact the surface of a formation face and/or proppant pack, thereby forming a type of filter cake that blocks the pore spaces in the formation or proppant pack, and prevents fluid loss therein. Without limitation, when the composite diverting particulate may be used as a fluid loss control agent, it may be used in conjunction with a fracturing or drilling operation. For example, the composite diverting particulate may be included in a treatment fluid that is then placed into the portion of the subterranean formation at a pressure/rate sufficient to create or extend at least one fracture in that portion of the subterranean formation.

Composite diverting particulates have similar actions but strive for a somewhat different approach. Composite diverting particulates may be used to seal off a portion of the subterranean formation. By way of example, in order to divert a treatment fluid from permeable portions of the formation into the less permeable portions of the formation, a volume of treatment fluid may be pumped into the formation followed by composite diverting particulate to seal off a portion of the formation where the first treatment fluid penetrated. When desired for diversion, the composite diverting particulate may be added to the first treatment fluid or a slug of another treatment fluid may be prepared that contains the composite diverting particulate. After the composite diverting particulate is placed, a second treatment fluid may be placed wherein the second treatment fluid may be diverted to a new zone for treatment by the previously placed composite diverting particulate. When being placed, the treatment fluid containing the composite diverting particulate may flow most readily into the portion of the formation having the largest pores, fissures, or vugs, until that portion is bridged and sealed, thus diverting the remaining fluid to the next most permeable portion of the formation. These steps may be repeated until the desired number of stages of treating fluid has been pumped. In an embodiment, the composite diverting particulate in the first treatment fluid may be smaller than the composite diverting particulate in the second treatment fluid. In another instance, the composite diverting particulate in the first treatment fluid may be larger than the composite diverting particulate in the second treatment fluid, for example, by at least 5% or more. Without limitation, composite diverting particulates may be included in treatment fluids introduced at matrix flow rates; that is, flow rates and pressures that are below the rate/pressure sufficient to create or extend fractures in that portion of a subterranean formation. Alternatively, the treatment fluids including composite diverting particulate may be introduced above the fracturing pressure of the subterranean formation.

As previously described, the composite diverting particulate may be used in fracturing treatments. A method of fracturing a wellbore may include placing a fracturing fluid into a portion of a wellbore. The fracturing fluid may be used to create or extend one or more fractures in the subterranean formation. The fracturing fluid may enter flow paths to create one or more primary fractures extending from the wellbore into the subterranean formation. Branches may extend from the primary fractures. A fracturing fluid, commonly referred to as a pre-pad or pad fluid, may be injected to initiate the fracturing of a subterranean formation prior to the injection of proppant particulates. The pre-pad or pad fluid may be proppant-free or substantially proppant-free. The proppant particulates may be suspended in a fracturing fluid which may be injected into the subterranean formation to create and/or extend at least one fracture. In order to create and/or extend a fracture, a fluid is typically injected into the subterranean formation at a rate sufficient to generate a pressure above the fracturing pressure.

In the fracturing treatment, it may be desired to plug previously formed flow paths in order to fracture additional portions of the subterranean formation. The composite diverting particulate may be introduced into the subterranean formation to form a barrier that restricts entry of additional fracturing fluid within the previously formed flow paths. An example method may include introducing a fracturing fluid into a subterranean formation at or above a fracturing pressure of the subterranean formation. The method may further include introducing a composite diverting particulate into the subterranean formation to thereby form a barrier that restricts fluid flow at a first location in the subterranean formation. The method may further include diverting the fracturing fluid to a second location in the subterranean formation. The composite diverting particulate may be placed into the subterranean formation by forming a slug of a treatment fluid having a different composition than the fracturing fluid or by adding the composite diverting particulate directly to the fracturing fluid, for example, creating a slug of the fracturing fluid including the composite diverting particulate. The composite diverting particulate may form a barrier at the first location to selectively place the fracturing fluid at one or more additional locations in the subterranean formation.

After a well treatment using the composite diverting particulate, the wellbore and/or the subterranean formation may be prepared for production, for example, production of a hydrocarbon, therefrom. Preparing the wellbore and/or formation for production may include removing the composite diverting particulate from one or more flow paths, for example, by allowing the composite diverting particulate to degrade and subsequently recovering hydrocarbons from the formation via the wellbore. In an embodiment, the reservoir pressure may dislodge the composite diverting particulate from one or more flow paths for flowback of the material to the surface. As previously described, the composite diverting particulate may be degradable such that the barrier formed by the composite diverting particulate may be removed. The degradable polymer may be degraded by materials purposely placed in the formation by injection, mixing the degradable particle with delayed reaction degradation agents, or other suitable means previously described to induce degradation.

Removal of the composite diverting particulate particulates, if desired, may be affected by any number of suitable treatments. By way of example, the composite diverting particulate may be removed, in some embodiments, by dissolution, acid hydrolysis, and/or by contact with oxidizers. Removal may include contacting the composite diverting particulate with an oxidizer, such as persulfate, alkali metal chlorite or hypochlorite, peroxides, ammonium or metal chlorate, bromate, iodates or perchlorate, perbromate, or periodate. Without limitation, specific examples of suitable oxidizers may include sodium persulfate, ammonium persulfate, potassium persulfate, lithium hypochlorite, or sodium hypochlorite, calcium hypochlorite, sodium chlorate, sodium bromate, sodium iodate, sodium perchlorate, sodium perbromate, sodium periodate, potassium chlorate, potassium bromate, potassium iodate, potassium perchlorate, potassium perbromate, potassium periodate, ammonium chlorate, ammonium bromate, ammonium iodate, ammonium perchlorate, ammonium perbromate, ammonium periodate, magnesium chlorate, magnesium bromate, magnesium iodate, magnesium perchlorate, magnesium perbromate, magnesium periodate, zinc chlorate, zinc bromate, zinc iodate, zinc perchlorate, zinc perbromate, zinc periodate, sodium perborate, t-butyl hydroperoxide, or combinations thereof. The oxidizer may be introduced into the formation by way of the wellbore. Without limitation, embodiments of the composite diverting particulate particulates may be susceptible to hydrolysis by acids.

Figure 4:
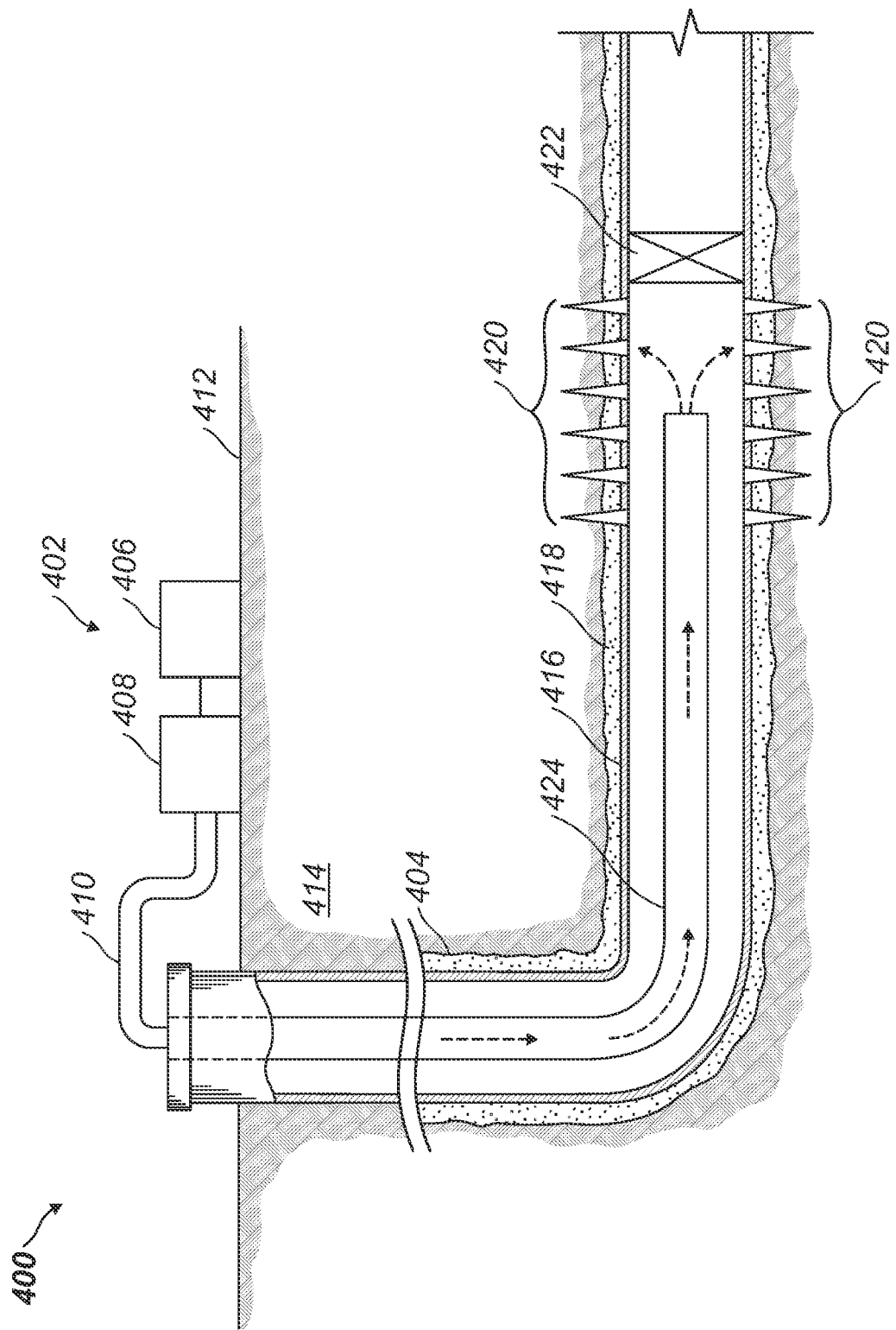
FIG. 4 is a schematic illustration of example well system showing placement of a treatment fluid into a wellbore.

Example methods of using the composite diverting particulate particulates will now be described in more detail with reference to FIG. 4. Any of the previous examples of the composite diverting particulate particulates may apply in the context of FIG. 4. FIG. 4 illustrates an example well system 400 that may be used for preparation and delivery of a treatment fluid downhole. It should be noted that while FIG. 4 generally depicts a land-based operation, those skilled in the art will readily recognize that the principles described herein are equally applicable to subsea operations that employ floating or sea-based platforms and rigs, without departing from the scope of the disclosure.

Referring now to FIG. 4, a fluid handling system 402 is illustrated. The fluid handling system 402 may be used for preparation of a treatment fluid including the composite diverting particulate and for introduction of the treatment fluid into a wellbore 404. The fluid handling system 402 may include mobile vehicles, immobile installations, skids, hoses, tubes, fluid tanks or reservoirs, pumps, valves, and/or other suitable structures and equipment. As illustrated, the fluid handling system 402 may include a fluid supply vessel 406, pumping equipment 408, and wellbore supply conduit 410. While not illustrated, the fluid supply vessel 406 may contain one or more components of the treatment fluid (e.g., composite diverting particulate particulates, base fluid, etc.) in separate tanks or other containers that may be mixed at any desired time. Pumping equipment 408 may be fluidically coupled with the fluid supply vessel 406 and wellbore supply conduit 410 to communicate the treatment fluid into wellbore 404. Fluid handling system 402 may also include surface and downhole sensors (not shown) to measure pressure, rate, temperature and/or other parameters of treatment. Fluid handling system 402 may also include pump controls and/or other types of controls for starting, stopping, and/or otherwise controlling pumping as well as controls for selecting and/or otherwise controlling fluids pumped during the injection treatment. An injection control system may communicate with such equipment to monitor and control the injection of the treatment fluid. As depicted in FIG. 4, the fluid supply vessel 406 and pumping equipment 408 may be above the surface 412 while the wellbore 404 is below the surface 412. As will be appreciated by those of ordinary skill in the art, well system 400 may be configured as shown in FIG. 4 or in a different manner, and may include additional or different features as appropriate. By way of example, fluid handling system 402 may be deployed via skid equipment, marine vessel, or may be included of sub-sea deployed equipment.

Without continued reference to FIG. 4, well system 400 may be used for introduction of a treatment fluid into wellbore 404. The treatment fluid may contain a base fluid (which may be oil- or aqueous-based) and composite diverting particulate, described herein. Generally, wellbore 404 may include horizontal, vertical, slanted, curved, and other types of wellbore geometries and orientations. Without limitation, the treatment fluid may be applied through the wellbore 404 to subterranean formation 414 surrounding any portion of wellbore 404. As illustrated, the wellbore 404 may include a casing 416 that may be cemented (or otherwise secured) to wellbore wall by cement sheath 418. Perforations 420 allow the treatment fluid and/or other materials to flow into and out of the subterranean formation 414. A plug 422, which may be any type of plug (e.g., bridge plug, etc.) may be disposed in wellbore 404 below the perforations 420 if desired. While FIG. 4 illustrates use of treatment fluid in a cased section of wellbore 404, it should be understood that treatment fluid may also be used in portions of wellbore 404 that are not cased.

The treatment fluid including the composite diverting particulate may be pumped from fluid handling system 402 down the interior of casing 416 in wellbore 404. As illustrated, well conduit 424 (e.g., coiled tubing, drill pipe, etc.) may be disposed in casing 416 through which the treatment fluid may be pumped. The well conduit 424 may be the same or different than the wellbore supply conduit 410. For example, the well conduit 424 may be an extension of the wellbore supply conduit 410 into the wellbore 404 or may be tubing or other conduit that is coupled to the wellbore supply conduit 410. The treatment fluid may be allowed to flow down the interior of well conduit 424, exit the well conduit 424, and finally enter subterranean formation 414 surrounding wellbore 404 by way of perforations 420 through the casing 416 (if the wellbore is cased as in FIG. 4) and cement sheath 418. Without limitation, the treatment fluid may be introduced into subterranean formation 414 whereby one or more fractures (not shown) may be created or enhanced in subterranean formation 414. For example, the treatment fluid may be introduced into subterranean formation 414 at or above a fracturing pressure. As previously, described, the treatment fluid including the composite diverting particulate particulates may be placed into the subterranean formation 414 after a previous treatment has been performed such that additional locations in the subterranean formation 414 may be treated. Without limitation, at least a portion of the composite diverting particulate may be deposited in the subterranean formation 414. As previously described, the composite diverting particulate may form a barrier to fluid flow in the subterranean formation.

As previously described, a variety of treatments may be performed using the composite diverting particulate. Suitable subterranean treatments may include, but are not limited to, drilling operations, production stimulation operations (e.g., fracturing, acidizing), workover operations, and well completion operations (e.g., gravel packing or cementing). These treatments may generally be applied to the subterranean formation. The barrier to fluid flow formed in the subterranean formation 414 by the composite diverting particulate may be used in these treatments for diversion and fluid loss control, among others. For example, the diversion of the treatment fluids may help ensure that the treatment fluids are more uniformly distributed in the subterranean formation.

Figure 5A:
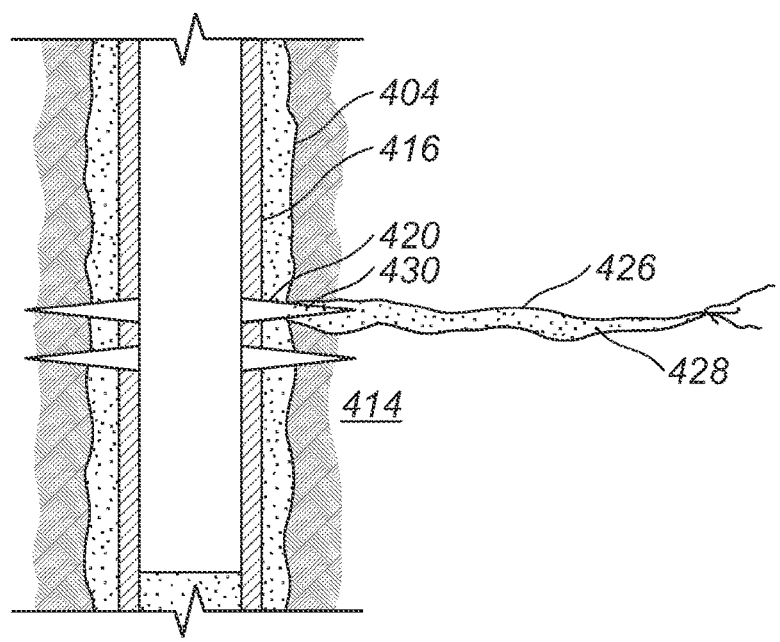
FIGS. 5A and 5B are schematic illustrations showing use of composite diverting particulates in an example fracturing treatment.

The well treatment may include a fracturing treatment in which one or more fractures may be created or extended in a subterranean formation 414. Referring now to FIG. 5A, fracture 426 is shown extending from wellbore 404. The fracturing of the subterranean formation 414 may be accomplished using any suitable technique. By way of example, a fracturing treatment may include introducing a fracturing fluid into subterranean formation 414 at or above a fracturing pressure. The fracturing fluid may be introduced by pumping the fracturing fluid through casing 416, perforations 420, and into subterranean formation 414 surrounding wellbore 404. Alternatively, a jetting tool (not shown) may be used to initiate the fracture 426. The fracturing fluid may include proppant particulates which may be deposited on the fracture 426 to form a proppant pack 428.

Figure 5B:
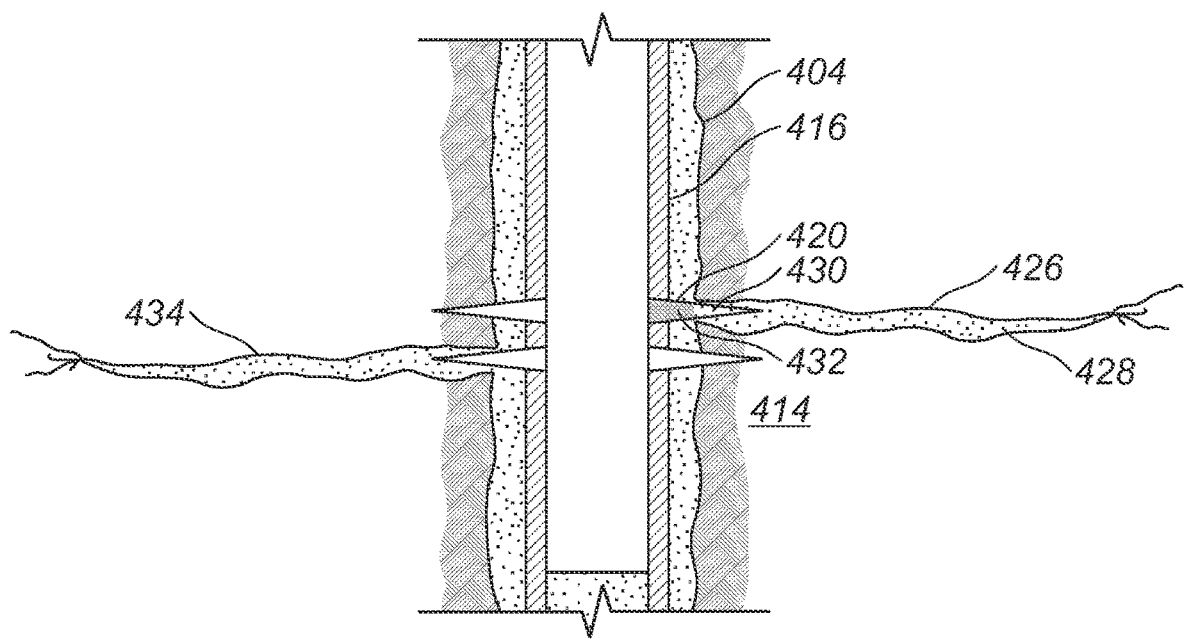

To form a barrier that can divert the fracturing fluid to additional flow paths, the composite diverting particulate may be introduced into the subterranean formation 414. The composite diverting particulate may be carried into the subterranean formation 414 in a treatment fluid. The composite diverting particulate may be introduced through the perforation 420 and into a perforation tunnel 430. Without limitation, the treatment fluid including the composite diverting particulate may be a slug of the fracturing fluid including the composite diverting particulate or a separate treatment fluid including the composite diverting particulate. The treatment fluid including the composite diverting particulate may be introduced above the fracturing pressure or at matrix flow rates. Without limitation, the proppant pack 428 may act as a filter screening the composite diverting particulate out of the treatment fluid. As a result, a layer or pack of the composite diverting particulate may form on the proppant particulates, in the perforation tunnel 430, or both. As shown in FIG. 5B, a barrier 432 including the composite diverting particulate may be formed in the perforation tunnel 430. The resulting barrier 432 may be able to divert fluids away from fracture 426. Such diversion may result in a back pressure build up that may be detected at surface 412 (e.g., shown on FIG. 4). After formation of the barrier 432, additional subterranean treatments may be performed. As shown on FIG. 5B, additional fracture 434 may be created in subterranean formation 414. Additional fracture 434 may be formed, for example, in a portion of subterranean formation 414 with least resistance to fluid flow, as barrier 432 has diverted the fracturing fluid into additional portions of the subterranean formation 414 in which treatment may be desired.

The exemplary composite diverting particulate particulates disclosed herein may directly or indirectly affect one or more components or pieces of equipment associated with the preparation, delivery, recapture, recycling, reuse, and/or disposal of the composite diverting particulate particulates. For example, the composite diverting particulate particulates may directly or indirectly affect one or more mixers, related mixing equipment, mud pits, storage facilities or units, composition separators, heat exchangers, sensors, gauges, pumps, compressors, and the like used to generate, store, monitor, regulate, and/or recondition the sealant composition. The composite diverting particulate particulates may also directly or indirectly affect any transport or delivery equipment used to convey the composite diverting particulate particulates to a well site or downhole such as, for example, any transport vessels, conduits, pipelines, trucks, tubulars, and/or pipes used to compositionally move the composite diverting particulate particulates from one location to another, any pumps, compressors, or motors (e.g., topside or downhole) used to drive the composite diverting particulate particulates into motion, any valves or related joints used to regulate the pressure or flow rate of the composite diverting particulate particulates (or fluids containing the same composite diverting particulate particulates), and any sensors (i.e., pressure and temperature), gauges, and/or combinations thereof, and the like. The disclosed composite diverting particulate particulates may also directly or indirectly affect the various downhole equipment and tools that may come into contact with the composite diverting particulate particulates such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Accordingly, this disclosure describes systems, compositions, and methods that may use composite diverting particulate particulates for diversion, fluid loss control, and/or other subterranean treatments for controlling fluid flow in subterranean formations. Without limitation, the systems, compositions, and methods may include any of the following statements.

Statement 1: A method comprising: introducing a treatment fluid into a wellbore penetrating a subterranean formation wherein the treatment fluid comprises: a base fluid; and composite diverting particulates, wherein the composite diverting particulates each comprise a degradable polymer and an oil-soluble material, wherein the composite diverting particulates at least partially plug a zone in the subterranean formation; and diverting at least a portion of the treatment fluid and/or a subsequently introduced fluid away from the zone.

Statement 2: The method of statement 1, wherein the degradable polymer comprises an at least one degradable polymer selected from the group consisting of aliphatic poly(ester); poly(lactide); poly(glycolide); poly(ε-caprolactone); poly(hydroxyester ether); poly(hydroxybutyrate); poly(anhydride); polycarbonate; polyol; poly(orthoester); poly(aminoacid); poly(ethyleneoxide); poly(phosphazene); poly(etherester), hydroxy propyl methylcellulose, pectin, polyethylene oxide, polyvinyl alcohol, plasticized polyvinyl alcohol, alginate, polycaprolactone, gelatinised starch-based material, polyester amide, polyamide, and any combination thereof.

Statement 3: The method of statement 1 or 2, wherein the degradable polymer comprises polyvinyl alcohol.

Statement 4: The method of any preceding statement, wherein the oil-soluble material comprises at least one material selected from the group consisting of an oil-soluble polymer, an oil-soluble resin, an oil-soluble elastomer, an oil-soluble rubbers, a polybutadiene, polyisoprene, a polyacrylic, a polyamide, a polyether urethane, a polyester urethane, a polyolefin, a polyethylene, a polypropylene, a polystyrene, a carbonic acid, an amine, a wax, an animal wax, a plant wax, a mineral wax, a petroleum wax, asphaltenes, gilsonite, and any combination thereof.

Statement 5: The method of any preceding statement, wherein the oil-soluble material has a melting point within about 5° C. of bottomhole static temperature.

Statement 6: The method of any preceding statement, wherein the oil-soluble material dissolves in an oil-based solvent.

Statement 7: The method of statement 6, wherein the oil-based solvent comprises at least one component selected from the group consisting of organic oils, synthetic oils, oils derived from petroleum products, mineral oils, and any combination thereof.

Statement 8: The method of any preceding statement, wherein the composite diverting particulates each comprise a first region comprising the degradable polymer and a second region comprising the oil-soluble material.

Statement 9: The method of claim 8, wherein the oil-soluble material is coated with the degradable polymer.

Statement 10: The method of any preceding statement, wherein the composite diverting particulates each comprise a homogenous compound that comprises the degradable polymer and the oil-soluble material.

Statement 11: The method of statement 1, wherein the composite diverting particulates each comprise a continuous phase of the degradable polymer and an internal phase of the oil-soluble material.

Statement 12: The method of any preceding statement, further comprising introducing an additional diverting agent into the zone, wherein the additional diverting agent forms a plug with the composite diverting particulates.

Statement 13: The method of claim 12, wherein the additional diverting agent is a second degradable polymer selected from the group consisting of aliphatic poly(ester); poly(lactide); poly(glycolide); poly(ε-caprolactone); poly(hydroxyester ether); poly(hydroxybutyrate); poly(anhydride); polycarbonate; polyol; poly(orthoester); poly(aminoacid); poly(ethyleneoxide); poly(phosphazene); poly(etherester), hydroxy propyl methylcellulose, pectin, polyethylene oxide, polyvinyl alcohol, plasticized polyvinyl alcohol, alginate, polycaprolactone, gelatinised starch-based material, polyester amide, polyamide, and any combination thereof.

Statement 14: The method of any preceding statement, further comprising allowing the composite diverting particulates to dissolve or degrade.

Statement 15: The method of any preceding statement, wherein the treatment fluid is injected into the wellbore at or above a fracture gradient of the subterranean formation.

Statement 16: The method of any preceding statement, wherein prior to the step of introducing, the method further comprises mixing the treatment fluid in a mixer, wherein the introducing comprising pumping the treatment fluid into the wellbore with a pump.

Statement 17: The method of any preceding statement, wherein the composite diverting particulates are present in an amount of about 1% to about 75% by volume of the treatment fluid, wherein the composite diverting particulates have a $D_v50$ particle size ranging from about 400 microns to about 10 millimeters, wherein the degradable polymer comprises polyvinyl alcohol and is present in the composite diverting particulate in an amount of about 25% to about 75% based on a total weight of the composite diverting particulates, wherein oil-soluble material is present in the composite diverting particulates in an amount of about 25% to about 75% based on a total weight of the composite diverting particulates.

Statement 18: A treatment fluid comprising: a base fluid; and composite diverting particulates, wherein the composite diverting particulates each comprise a degradable polymer and an oil-soluble material.

Statement 19: The treatment fluid of statement 18, wherein the degradable polymer comprises an at least one degradable polymer selected from the group consisting of aliphatic poly(ester); poly(lactide); poly(glycolide); poly(ε-caprolactone); poly(hydroxyester ether); poly(hydroxybutyrate); poly(anhydride); polycarbonate; polyol; poly(orthoester); poly(aminoacid); poly(ethyleneoxide); poly(phosphazene); poly(etherester), hydroxy propyl methylcellulose, pectin, polyethylene oxide, polyvinyl alcohol, plasticized polyvinyl alcohol, alginate, polycaprolactone, gelatinised starch-based material, polyester amide, polyamide, and any combination thereof, wherein the oil-soluble material comprises at least one material selected from the group consisting of an oil-soluble polymer, an oil-soluble resin, an oil-soluble elastomer, an oil-soluble rubbers, a polybutadiene, polyisoprene, a polyacrylic, a polyamide, a polyether urethane, a polyester urethane, a polyolefin, a polyethylene, a polypropylene, a polystyrene, a carbonic acid, an amine, a wax, an animal wax, a plant wax, a mineral wax, a petroleum wax, and any combination thereof.

Statement 20: The treatment fluid of statement 18 or 19, wherein the composite diverting particulates each comprise a first region comprising the degradable polymer and a second region comprising the oil-soluble material, wherein the second region is coated by the first region, wherein the degradable polymer comprises a polyvinyl alcohol.

To facilitate a better understanding of the present disclosure, the following examples of certain aspects of some of the systems and methods are given. In no way should the following examples be read to limit, or define, the entire scope of the disclosure.

Example 1

Figure 6:
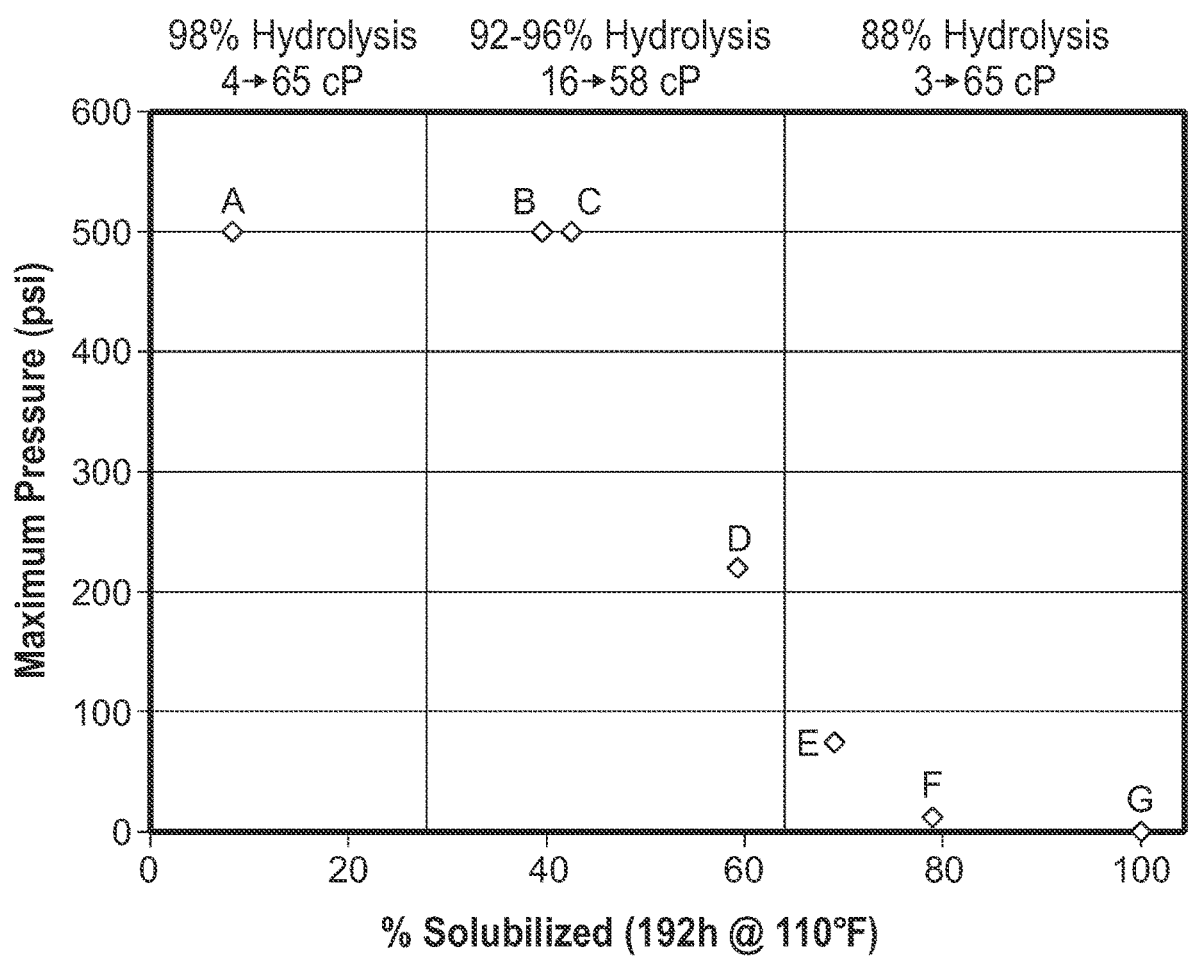
FIG. 6 is a chart illustrating the effect of different grades of polyvinyl alcohol on the bridge stability, solubilization rate, and fluid loss performance of a composite diverting particulate that includes the polyvinyl alcohol.

Tests were run to determine the effect of different grades of PVA on the bridge stability, solubilization rate, and fluid loss performance. Each PVA grade was defined by its grade (i.e. degree of hydrolysis and molecular weight/viscosity) and was tested in water at a temperature of about 43° C. for about 192 hours. Each PVA grade was tested to determine its bridge/seal stability (i.e. the maximum pressure the bridge/seal could withstand) using a bench-top unit with a 500 μm slot at 43° C. The results are provided in Table 1 and depicted in FIG. 6.

TABLE 1

| PVA | Degree of Hydrolysis (%) | Weight Average Molecular Weight | Viscosity (cP) | % Solubilized | Max Pressure |
|---|---|---|---|---|---|
| A | 98.0-98.8 | 85,000-124,000 | 28.0-32.0 | 8 | 500 psi (3450 kPa) |
| B | 95.5-96.5 | 85,000-124,000 | 27.0-31.0 | 39 | 500 psi (3450 kPa) |
| C | 92.0-94.0 | 146,000-186,000 | 53.0-63.0 | 41 | 500 psi (3450 kPa) |
| D | 91.0-93.0 | 50,000-85,000 | 14.5-19.5 | 59 | 210 psi (1450 kPa) |
| E | 87.0-89.0 | 146,000-186,000 | 45.0-55.0 | 69 | 85 psi (590 kPa) |
| F | 87.0-89.0 | 50,000-85,000 | 17.5-20.5 | 79 | 15 psi (100 kPa) |
| G | 87.0-89.0 | 13,000-23,000 | 3.0-3.7 | 100 | 0 psi (0 kPa) |

*Viscosity of 4% aqueous solution

The results show that a PVA with a higher grade (more hydrolysis and higher molecular weight/viscosity) has good fluid loss performance but low solubility. A PVA with a lower grade (less hydrolysis and lower viscosity) has poor fluid loss performance but high solubility.

It should be understood that the compositions and methods are described in terms of "including," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method comprising:
   introducing a treatment fluid into a wellbore penetrating a subterranean formation wherein the treatment fluid comprises:
   a base fluid; and
   composite diverting particulates, wherein the composite diverting particulates each comprise a degradable polymer and an oil-soluble material, wherein the degradable polymer comprises (i) plasticized polyvinyl alcohol and a plurality of grades of polyvinyl alcohol, (ii) a plurality of grades of plasticized polyvinyl alcohol, or (iii) both (i) and (ii), and further wherein the composite diverting particulates are formed from co-extrusion of the degradable polymer and the oil-soluble material; and
   at least partially plugging a zone in the subterranean formation using a first portion of the treatment fluid; and
   diverting a second portion of the treatment fluid or the second portion of the treatment fluid and a subsequently introduced fluid away from the zone.

2. The method of claim 1, wherein the oil-soluble material comprises at least one material selected from the group consisting of an oil-soluble polymer, an oil-soluble resin, an oil-soluble elastomer, an oil-soluble rubber, a polybutadiene, a polyisoprene, a polyacrylic, a polyamide, a polyether urethane, a polyester urethane, a polyolefin, a polyethylene, a polypropylene, a polystyrene, a carbonic acid, an amine, a wax, an animal wax, a plant wax, a mineral wax, a petroleum wax, asphaltenes, gilsonite, and any combination thereof.

3. The method of claim 1, wherein the oil-soluble material has a melting point within 5° C. above or below a bottom-hole static temperature.

4. The method of claim 1, wherein the oil-soluble material dissolves in an oil-based solvent.

5. The method of claim 4, wherein the oil-based solvent comprises at least one component selected from the group consisting of organic oils, synthetic oils, mineral oils, and any combination thereof.

6. The method of claim 1, wherein the composite diverting particulates each comprise a first region comprising the degradable polymer and a second region comprising the oil-soluble material.

7. The method of claim 1, wherein the composite diverting particulates each comprise a homogenous compound that comprises the degradable polymer and the oil-soluble material.

8. The method of claim 1, further comprising introducing an additional diverting agent into the zone, wherein the additional diverting agent forms a plug with the composite diverting particulates.

9. The method of claim 8, wherein the additional diverting agent is a second degradable polymer selected from the group consisting of aliphatic poly(ester); poly(lactide); poly (glycolide); poly($\varepsilon$-caprolactone); poly(hydroxyester ether); poly(hydroxybutyrate); poly(anhydride); polycarbonate; polyol; poly(orthoester); poly(aminoacid); poly(ethyleneoxide); poly(phosphazene); poly(etherester), hydroxy propyl methylcellulose, pectin, polyvinyl alcohol, plasticized polyvinyl alcohol, alginate, gelatinized starch-based material, polyester amide, polyamide, and any combination thereof.

10. The method of claim 1, wherein after the step of diverting, the method further comprises allowing the composite diverting particulates to dissolve or degrade.

11. The method of claim 1, wherein prior to the step of introducing, the method further comprises mixing the treatment fluid in a mixer, wherein the introducing comprises pumping the treatment fluid into the wellbore with a pump.

12. The method of claim 1, wherein the composite diverting particulates are present in an amount of about 1% to about 75% by volume of the treatment fluid, wherein the composite diverting particulates have a $D_v50$ particle size ranging from about 400 microns to about 10 millimeters, wherein the degradable polymer is present in each of the composite diverting particulates in an amount of about 25% to about 75% based on a total weight of each of the composite diverting particulates, wherein the oil-soluble material is present in each of the composite diverting particulates in an amount of about 25% to about 75% based on a total weight of each of the composite diverting particulates.

* * * * *